US006763196B2

(12) United States Patent
Yafuso

(10) Patent No.: US 6,763,196 B2
(45) Date of Patent: Jul. 13, 2004

(54) LASER COMMUNICATION SYSTEM WITH SOURCE TRACKING

(75) Inventor: Eiji Yafuso, Carlsbad, CA (US)

(73) Assignee: Trex Enterprises Corporation, San Diego, CA (US)

( * ) Notice: Subject to any disclaimer, the term of this patent is extended or adjusted under 35 U.S.C. 154(b) by 311 days.

(21) Appl. No.: 09/863,635

(22) Filed: May 21, 2001

(65) Prior Publication Data

US 2003/0194238 A1 Oct. 16, 2003

Related U.S. Application Data

(60) Provisional application No. 60/266,015, filed on Feb. 2, 2001.

(51) Int. Cl.[7] ........................ H04B 10/00; H04B 10/105
(52) U.S. Cl. ........................ 398/156; 398/121; 398/122
(58) Field of Search ................................ 359/152, 172, 359/159

(56) References Cited

U.S. PATENT DOCUMENTS

| | | | | |
|---|---|---|---|---|
| 5,229,889 A | * | 7/1993 | Kittell | 359/849 |
| 5,710,652 A | * | 1/1998 | Bloom et al. | 359/152 |
| 5,986,787 A | * | 11/1999 | Ohshima et al. | 359/159 |
| 6,118,131 A | * | 9/2000 | Korevaar | 250/559.3 |
| 6,347,001 B1 | * | 2/2002 | Arnold et al. | 359/159 |
| 6,462,846 B1 | * | 10/2002 | DeLong | 359/152 |
| 6,507,424 B2 | * | 1/2003 | Sakanaka | 359/159 |

* cited by examiner

Primary Examiner—Leslie Pascal
Assistant Examiner—David C Payne
(74) Attorney, Agent, or Firm—John R. Ross; John R. Ross, III

(57) ABSTRACT

A free space laser communication system that maintains dynamic alignment is presented. The system comprises two laser transceivers positioned a distance apart. Each transceiver includes the following components. A beacon laser is provided for transmitting a beacon beam at a first wavelength in a beam having a first divergence. A signal laser is provided for transmitting a signal beam carrying information to be transmitted to the other transceiver. A special telescope system is provided for collecting both the incoming beacon beam and the incoming signal beam from the other transceiver and for transmitting at least an outgoing signal beam. In a preferred embodiment the special telescope images the pupil of the telescope onto a tracking mirror. The tracking mirror pivots at least tilt and tip. The beacon beam is reflected from the tracking mirror and focused on a CCD array which monitors the direction of the beacon beam and provides a feedback signal to the tracking mirror to maintain the tracking mirror in positions which direct the beacon beam to a predetermined position on the CCD array and also directs the signal beam through a small aperture to a signal detector.

14 Claims, 1 Drawing Sheet

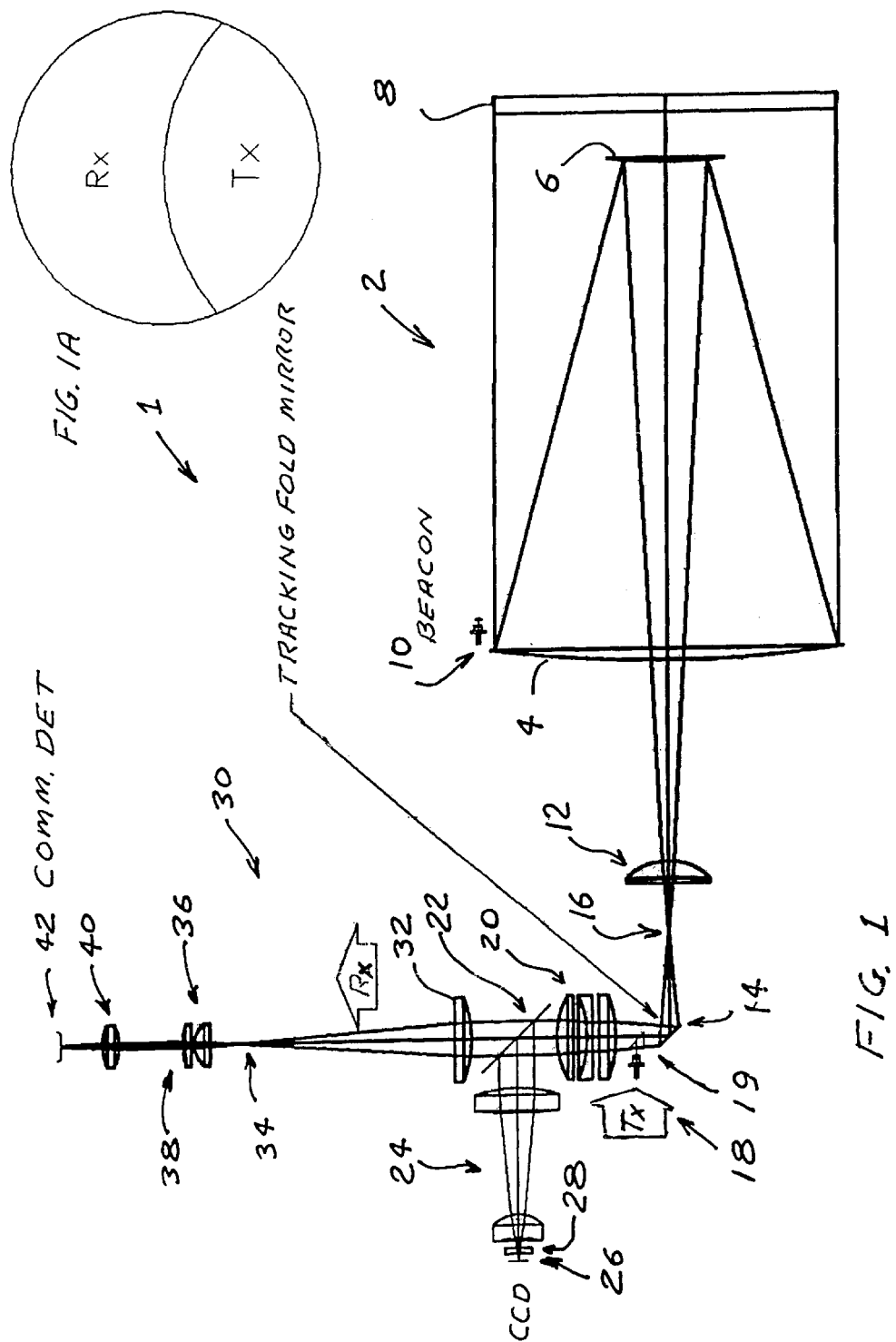

LASER COMMUNICATION SYSTEM WITH SOURCE TRACKING

This invention relates to free space communication systems and in particular to free space laser communication systems. This Application claims priority of a Provisional Application, Serial No. 60/266,015 filed Feb. 2, 2000.

BACKGROUND OF THE INVENTION

During the past several years, the telecommunication industry has enjoyed explosive growth. The industry has strained to meet the demand for increasing communication bandwidth. Global, national and regional telecommunication techniques primarily include: (1) telephone networks providing voice, data and FAX transmission using twisted pair wire, coaxial cable, fiber optics, microwave systems, and RF networks; and (2) television networks providing television through RF transmission, and coaxial cable, and (3) internet data utilizing some or all of the specified data transmission media. Television, telephone and data communication are also currently being provided through satellite-based systems. Growth in non-voice data communications including high-speed image and video data establishes the need for data communication at increasingly higher speeds than that required for voice communication alone.

Radio communication permits the user to be mobile. It does not require expensive wiring connecting the communication equipment. The problem with radio communication is that the available radio bandwidth is limited. A solution to limited bandwidth is to establish separate geographical cells which allows reuse of available bandwidth for each separate cell. By establishing a large number of independent cells, the number of users that can share the common bandwidth is increased. Nevertheless, since the RF data transmission is essentially broadcast, the permissible density of common-band cells, and likewise the maximum density of users that can be accommodated, is necessarily limited.

The need for alternative technologies for last mile and last few miles connectivity solutions is on the increase. In the past telephone and cable systems have generally operated on a regulated monopoly basis. Currently, however, the federal, state and local governments in the United States are encouraging competition in the provision of these services. Still, local telephone and cable companies are reluctant or charge heavily to share their installed infrastructure, and the installation of new cable or fiber connections can be prohibitively expensive, disruptive or otherwise not possible. In many developing countries there is no significant wired communication infrastructure in place and installing a wired infrastructure would be expensive and disruptive. Certain events such as the Olympic Games and the Super Bowl create temporary need for greatly expanded communication in a region. Disasters such as major ice storms or hurricanes can disrupt existing communications creating a need for temporary high-bandwidth communication equipment until the existing system can be repaired.

Techniques for providing free space optical communications are known. (See "A Brief History of Free-Space Laser Communications" by David L. Begley in *Selected Papers on Free-Space Laser Communications*, David L. Begley, ed., SPIE Optical Engineering Press, 1991.) For example free space laser communication has been proposed for satellite to satellite communication, where the laser beam can provide extremely high bandwidth over long distance point-to-point links. Satellite communications provide a nearly ideal venue for the application of laser communication technology, where the beam path is above the earth's atmosphere. By contrast, ground-based free space laser communication has generally been constrained to relatively short distances because of the adverse effects of atmospheric conditions such as turbulence.

Laser sources are capable of providing extremely narrow beams, with footprints of tens of centimeters at kilometer distances easily achievable. These extremely narrow beams permit an almost unlimited number of local links to operate at the same carrier frequency without interfering with one another and yet requiring low transmission power levels to achieve good signal-to-noise. The difficulty with arbitrary reduction of transmitted beam size is in maintaining alignment between transmitters and receivers. Once the beam is reduced below a few hundred microradians, even the most minor vibration or other perturbation will be sufficient to cause the transmitted beam to entirely miss the remote receiver.

What is needed is a laser communication system with transceivers which can be installed and easily aligned and will remained aligned.

SUMMARY OF THE INVENTION

The present invention provides a free space laser communication system which dynamically maintains link alignment. The system comprises two laser transceivers positioned a distance apart. Each transceiver includes the following components. A beacon laser is provided for transmitting a beacon beam at a first wavelength in a beam having a first divergence. A signal laser is provided for transmitting a signal beam carrying information to be transmitted to the other transceiver. A special telescope system is provided for collecting both the incoming beacon beam and the incoming signal beam from the other transceiver and for transmitting an outgoing signal beam. A tracker is provided to maintain dynamic alignment. A high-speed detector is provided to receive the data transmitted from the remote terminal.

The optical system images the pupil of the telescope onto a tracking mirror, which pivots in tip and tilt. The received beacon beam is reflected from the tracking mirror and focused on a CCD array that monitors the location of the remote beacon source and provides feedback to the tracking mirror. Based on this feedback, the tracking mirror tips and tilts as necessary to maintain the received beacon beam on a predetermined position of the CCD array, while simultaneously directing the received signal beam through a small aperture to the high-speed signal detector. The small aperture isolates the incoming signal beam from spatially distinct background radiation. The outgoing laser beam from the signal laser is also reflected from the tracking mirror and out of the telescope system toward the remote transceiver. In a preferred embodiment the signal laser for both transceivers is a single mode diode laser operating at 850 nm. The divergence of the signal beam from each transceiver is approximately 200 microradians, providing a footprint at a two-mile transceiver separation of approximately 2 feet. The beacon laser is a diode laser operating 785 nm. The beacon beams are given much larger divergences on the order of one degree to provide for tracking over a wide dynamic range. Preferred embodiments permit communication at high data rates of up to 2.5 gigabits per second at ranges in excess of six miles in clear weather. The dynamic and automatic tracking features of the present invention permit the system to be installed and made operational in just a few minutes. In case alignment is disrupted for any reason the system automatically realigns itself as soon as the cause is removed.

The present invention provides a laser-based telecommunication system, which can be installed and aligned easily, efficiently and which will remain aligned for extended periods of operation. Additionally, this system can be operated over distances ranging from hundreds of meters to greater than ten kilometers, with communication speeds in excess of gigabits per second and with high link reliability in the face of local perturbations and path atmospheric turbulence.

BRIEF DESCRIPTION OF THE DRAWING

FIGS. 1 and 1A showing a preferred embodiment of the present invention.

DETAILED DESCRIPTION OF PREFERRED EMBODIMENTS

Preferred embodiments of the present invention can be described by reference to the drawing.

Preferred Embodiment

A first preferred embodiment of the present invention is shown in FIGS. 1 and 1A.

In this embodiment a special tracking technique is provided that serves the dual purpose of centering the received (Rx) signal on a communication detector and simultaneously aligning the transmit (Tx) communication signal on the remote receiver. Differences between this embodiment to prior art laser transceivers include:

1) Common optical aperture for both transmit and receive, Tx and Rx, (i.e., common pupil) beams,
2) Opto-mechanical tracking as opposed to gimballed mechanical tracking, and
3) Subdivided pupil areas for Tx and Rx.

Advantages to this preferred embodiment include:

1) Reduced divergence of the Tx beam for improved SNR,
2) Simultaneous alignment of Tx and Rx by design,
3) No external moving parts and stationary assembly,
4) Small moving tracking elements which can then achieve faster, higher bandwidth tracking, and
5) Tracking over the entire angular field of view of Tx/Rx telescope.

The communication link includes two identical transceivers which in this example will be assumed to be located 2 miles apart. One transceiver will be described here and the reader should understand that the second transceiver is exactly the same.

Telescope

The transceiver 1 includes a Schmidt-Cassegrain telescope 2 comprising an 8-inch diameter F/2 primary mirror 4, a 2-inch diameter secondary mirror 6 which together with the primary mirror provides a 2 meter effective focal length at F/10. Telescopes of this type can be purchased from suppliers such as Celestron. An example is Celestron PNG-80TA. The Schmidt corrector plate 8 located at the optical entrance of the telescope represents the system stop.

Beacon Laser

The beacon laser 10 is mounted on the outside surface of telescope 2 as shown in FIG. 1. This laser is a semiconductor diode laser that produces a continuous laser beam of approximately 70 milliwatts output at a wavelength of 785 nm. These lasers are commercially available from suppliers such as Sanyo DL7041-201. Optics are provided (not shown) with the beacon laser to produce a divergence of about 12 milliradians.

Pupil Relay

A positive lens 12 is inserted to provide a relay of the system pupil/stop. Lens 12 may be a Melles Griot P/N 01-LMP003/007 meniscus lens, with 100 mm focal length and antireflection (A/R) coating for 750–1100 nm wavelength. The system stop, located at the telescope corrector plate is relayed to a position where a steering mirror 14 is placed as shown in FIG. 1. Positioning the tracking mirror here permits source tracking without causing skew aberrations in the Tx/Rx beam path. Additionally to relaying the pupil, insertion of the positive lens causes the telescope image plane to be moved in closer to the telescope (occurring at location 16 in FIG. 1 with a change in effective F/# from F/10 to approximately F/5.6.

Steering Mirror

Steering mirror 14 is a flat mirror inserted in the beam at a nominal 45-degree angle, which folds the optical path through a 90-degree angle. As previously discussed, the placement of the mirror is such that it resides at a relayed pupil plane. The mirror is able to tip and tilt about axes that lie in the plane of the mirror optical surface and form intersections with each other and with the system optical axis. The precise position of the mirror is dictated by a feedback signal from the tracker CCD, and based on the angular location of the remote transmitting terminal beacon as described below. In a preferred embodiment a voice coil driven mirror is used which can respond at rates of tens of Hz. One such mirror available from Santa Barbara Instrument Group with offices in Santa Barbara CA is their Model AO-7 tracking mirror.

Transmitter

Transmitter Tx is a single-mode, 150-milliwatt CW diode laser 18, operating at 850 nm. These lasers are commercially available from suppliers such as SDL Inc. SDL-5420. The laser is powered by electronics, providing an adjustable bias and appropriate modulation depth so that the laser output beam can be modulated to carry the desired information.

Laser driver electronics are available from suppliers such as Vitesse VSC7928 and the laser beam from this laser can be modulated to transmit at rates of up to 3.125 Gb/s. A pick off mirror 19 and appropriate optics are provided to insert the output beam of the laser into a portion of the system pupil located at tuning Mirror 14 such that the Tx output beam focuses at the relayed field position 16 of FIG. 1. This can be accomplished by standard COTS collimating optics in front of the laser, followed by a 100 mm focal length focusing lens not shown.

Triplet

Following insertion of the Tx laser 18, a triplet 20 is used to collimate the beam after the steering mirror. The triplet serves two purposes. The light path following the steering mirror is made collimated by the triplet, and off-axis beam bundles are field corrected to third order permitting a wide field imager to be used for tracking the beacon from the remote terminal. This preferred embodiment uses CVI Laser Corporation COTS lenses to make up the triplet. Lens 1: P/N PLCX-50.8-77.3-C. Lens 2: P/N PLCC-50.8-64.4-C. Lens 3: PLCX-50.8-51.5-C.

Dichroic Beam Splitter

Following the collimating triplet, a dichroic beam splitter 22 is inserted at 45 degrees such that the 785 rum beacon light is reflected through 90 degrees (to left in FIG. 1), while the 850 nm Tx light is transmitted toward the detector. The dichroic is an optical window with a custom designed and fabricated spectral interference coating, designed to have a 90% reflectivity at the beacon wavelength and a 98% throughput at the Tx wavelength. The reflectivities and throughputs are specified at the 45-degree nominal angle of incidence.

Wide Field Imager

The 785 nm beacon beam, after being selectively reflected from the dichroic beam splitter 22, is then imaged through a set of lenses 24 comprising a wide field imager for the tracking CCD. The optics are designed to provide field-corrected imaging over the field of regard of the telescope, approximately 1 degree full angle. The wide field imaging optics provide the image to the CCD array 26 at a magnification sufficient to fill the CCD with the telescope field of regard. In the illustrated case, the imager is a 0.75" (19 mm) CCD such that effective focal length of the wide field imager is constrained to approximately 61 mm. Within the lens set constituting the wide field imager there is also a narrow band pass spectral filter which eliminates all spectral background except the 785 nm beacon signal. Filters such as this are available from suppliers such as Omega Corp. A good choice is their Part No. XB131/SOR.

CCD Array

The CCD array 26 is a COTS 0.75" format CCD. The CCD output is read and centroided to locate the position of the transmitting terminal. The detector is preceded by a 20 nm wide spectral transmission filter centered on the beacon wavelength of 785 nm, providing rejection for noise outside the desired spectral region. Positional data is used to steer the steering mirror in such a way that the received beacon centroid is always driven to a home position which is chosen to center the signal beam through a narrow pinhole aperture 34 of signal detector 42 as described below.

Receiver Optics

Receiver optics 30 consists of a positive lens 32 followed by a pinhole with a diameter of about 0.015 mm at position 34 which is the focus of lens 32, followed by a collimating lens set 36, followed by a narrow band spectral filter 38, which rejects all spectral signals except the 850 nm communication signal, followed by a final focusing lens set 40. The first positive lens brings the light to a field position at which a pinhole is placed to narrow the object-space field of view to approximately 200 microradians. The light is then allowed to diverge to a collimating lens set, which then is followed by the narrow band pass spectral filter. Filter 38 provides a spectral band pass of 10 nm centered at 850 nm, again providing rejection of noise outside of the desired spectral band. Following the filter, the light is passed through a last focusing lens 40 that brings the light to a final focus at approximately F/4.

Signal Detector

The Rx signal detector 42 is an avalanche photodiode (APD) (Pacific Silicon Sensors P/N PSS-AD230-2.3G-TO5) with an integral transimpedance amplifier capable of 3.2 GHz detection bandwidth, and circuitry providing automatic gain control.

Rx and Tx Share Pupil

As can be seen in FIG. 1, 45 degree mirror 19 which inserts the transmit beam Tx into the beam path blocks a portion of the pupil as shown in FIG. 1A. The pupil that has been relayed to the fold mirror is partially obscured by the pick-off/19 mirror that serves to insert the Tx laser beam. The cross-section of the aperture can be see in the scaled axial view, FIG. 1A which illustrates that the two regions need be neither symmetric nor of equal area. Important to note is that any primary scattering events (single scatters) occurring as the Tx beam exits the shared optics will be unable to scatter back into the receiving aperture without a second scattering event. Any single-scatter Tx rays which are directed back into the Rx portion of the pupil will necessarily have a skew angle sufficient to miss the detector.

The Two Lasers

Beacon laser 10 transmitting at 785 nm is used to locate corresponding positions, while transmitter laser 18 at 850 nm is used for communication. The beacon lasers are given a divergence of several milliradians to enable corresponding terminals to acquire each other, allowing the transmitter beams to operate at much reduced divergences on the order of 200 microradians. FIG. 1 provides an example layout using the Schmidt-Cassegrain telescope as the Tx/Rx objective. The pupil of the system is relayed and demagnified to tracking fold mirror 14. By relaying the system stop 8 to a tracking mirror 14, the system is able to track object-space field motions using angular as opposed to spatial displacements. Since the laser communication receiver is a non-imaging detector with the goal of gathering maximum signal energy density from the transmitter, this scheme provides an ideal means of narrowing the instantaneous field of view which must be subtended by the receiving detector. This has the dual advantage of increasing signal to noise and reducing the size of the detector area, generally providing increased detector bandwidth by minimizing intrinsic junction capacitance of the avalanche photo diode permitting faster operation.

Other Embodiments

This design is possible using any combination of beacon and communication wavelengths which can satisfy the requirements that they are spectrally separable, and are sufficiently close in wavelength that for the stated purposes, behave similarly in the face of atmospheric absorption, scintillation, scattering, and any other optical degradation. Similarly, the optical elements and combinations used for objective, pupil relay, field relay, wide-field imager, tracking, and detector imaging can be varied to any number of configuration which accomplish the same functional goals.

The merits of this design are applicable to various intended link distances and to various specific aperture sizes, including pupils, stops, and fields.

The function of the tracking fold mirror can be accomplished using movable mirrors and/or powered lenses, with the prime goal of countering the effects of motion and phase offset caused by atmospheric turbulence, local vibrations, and other alignment perturbations.

Pupil segmentation can assume any pattern that provides for distinct regions for transmit and receive. The thrust of this invention is that it be used to provide a way of placing both simultaneously in the system pupil while reducing signal cross talk between them.

The pupil relay is shown to be immediately after the telescope optics for convenience but can, in general, be located at any position in the optical path after the system stop.

While the above description contains many specifications, the reader should not construe these as a limitation on the scope of the invention, but merely as exemplifications of preferred embodiments thereof. For example, the present invention is especially useful in those locations where fiber optics communication is not available and the distances between communications sites are less than about 2 to 5 miles. Accordingly the reader is requested to determine the scope of the invention by the appended claims and their legal equivalents, and not by the examples given above.

What is claimed is:

1. A free space laser communication system comprising at least tow transceivers defining a first transceiver and a second transceiver, said first transceiver comprising:
    A) a beacon laser for transmitting a beacon laser beam at a first nominal wavelength to said second transceiver,
    B) a telescope,
    C) a steering mirror,
    D) a beam splitter,
    E) an imaging detector,
    F) a signal detector,
    G) a pickoff mirror mounted optically between said steering mirror and said beam splitter and blocking a portion of both signal light and beacon light received from said second transceiver, and
    H) a signal laser configured to transmit via said pickoff mirror and said steering mirror a signal beam at a second nominal wavelength through said telescope to said second transceiver;
        said steering mirror and said beam splitter being configured to direct to said imaging detector, beacon laser beams collected by said telescope from said second transceiver and to direct to said signal detector, signal laser beams collected by said telescope from said second transceiver, said steering mirror being dynamically positioned in response to feedback signals from said imaging detector, wherein said pickoff mirror blocks any single-scatter rays from said signal laser from reaching said imaging detector and said signal detector.

2. A system as in claim 1 wherein said telescope is a Schmidt-Cassegrain telescope.

3. A system as in claim 1 wherein said beacon laser is a diode laser operating at a wavelength of about 785 nm.

4. A system as in claim 1 wherein said signal laser is a diode laser operating at a wavelength of about 850 nm.

5. A system as in claim 1 and further comprising optics to relay a pupil of said telescope to a relayed pupil position and said steering mirror is positioned at said relayed pupil position.

6. A system as in claim 1 wherein said steering mirror is configured to tilt and tip.

7. A system as in claim 1 wherein said steering mirror comprises a voice coil driver unit.

8. A system as in claim 1 wherein said imaging detector is a CCD detector.

9. A system as in claim 1 wherein said signal detector is an avalanche photodiode.

10. A system as in claim 9 wherein a pinhole aperture is located between said beam splitter and said signal detector.

11. A system as in claim 10 wherein said pinhole aperture is chosen and positioned to limit the object-space field of view of said signal detector to less than a milliradian.

12. A system as in claim 10 wherein said pinhole aperture is chosen and positioned to limit the object-space field of view of said signal detector to about 200 microradians.

13. A system as in claim 10 and further comprising optics to provide said imaging detector with a field of view of about 1 degree.

14. A system as in claim 11 and further comprising optics to provide said imaging detector with a field of view of about 1 degree.

* * * * *